Patented Apr. 23, 1935

1,999,097

UNITED STATES PATENT OFFICE 1,999,097

RESIN

Arthur Haroldson, Valparaiso, Ind., assignor to Continental Diamond Fibre Company, Newark, Del., a corporation of Delaware No Drawing. Application November 20, 1930, Serial No. 497,076

7 Claims. (Cl. 260—8)

My present invention relates in general to resinous compositions and has more particular reference to a flexible partially heat convertible complex.

My invention specifically relates to an improved resinous composition having a special utility as a flexible cement.

Numerous heat convertible resins have been made in the past but these are brittle in their finally converted form and are consequently unsuited for many purposes for which, but for their brittleness, they would be well suited.

An important object of my present invention is to provide a partially heat convertible resinous complex which has a relatively low melting point, which retains its elasticity when melted and which may be cured by the application of heat and pressure or heat alone to its final insoluble form in which the material is tough and flexible without having the brittleness of other heat curable resins heretofore provided.

Another important object of my present invention is the method for forming a partially heat convertible complex from a non-convertible material by adding an ingredient having hydroxyl and carboxyl groupings and utilizing these groups to promote polymerization of the nonconvertible complex.

Another important object of my present invention is to provide a resin of the class described soluble in inexpensive solvents whereby to avoid the use of expensive solvents as carriers for the resin when being applied as a cement or plasticizer.

Still another important object is to provide a resinous partially heat convertible cement, particularly adapted for use in the manufacture of flexible composite mica insulation, such for example as mica board, flexible mica insulation tape and the like, and which may also be used generally as a plastic shellac for molding purposes.

Another important object is to provide a partially heat convertible polyglycol resin.

Numerous other objects and advantages of the invention will be more fully understood from the following description of the preferred mode in which I practice my invention.

In order to produce the resin of my present invention I employ a polybasic acid (phthalic anhydride) and any suitable glycol, preferably a polyglycol, or its alkyl ether derivative.

Polyglycols are produced by eliminating water molecules from glycol. For example, by the elimination of one molecule of water from two molecules of glycol, a polyglycol known as diethylene glycol is formed; by the elimination of two molecules of water from three molecules of glycol a still higher polyglycol known as triethylene glycol is produced.

Both of these compounds contain the other group and the alcohol group and on that account they are good solvents for cellulose, esters, gums and resins. On account of the presence of two hydroxyl groups the polyglycols are very hygroscopic.

In practicing my invention I employ the following ingredients:

| | Grams |
|---|---|
| Polyglycol (diethylene glycol) | 106 |
| Acid (phthalic anhydride) | 148 |

These ingredients are mixed together and heated gently in a suitable receptacle until all of the phthalic anhydride has melted, the temperature of the mix is then gradually raised to approximately 165° C., and maintained at this temperature for approximately four hours. The resulting resin on cooling is a viscous liquid having a light amber color and is soluble in acetone, alcohol, chloroform, nitrocellulose and cellulose acetate solution.

Any polyglycol, polyglycol derivative, mixed polyglycols or alkyl ether derivatives of a polyglycol or mixed polyglycols may be used in place of diethylene glycol. Any suitable polybasic acid, such as phthalic acid, maleic, succinic, tartaric acid, etc., may be substituted for the phthalic anhydride. The resin obtained by the foregoing process is heat non-convertible and may be used as a plasticizer in varnishes, paints, shellac and in heat curable resins, such as Glyptal, Bakelite and the like, since the resin retains its plasticizing effect under heat and pressure.

I do not claim herein the heat non-convertible resin, since the same forms the subject matter of my co-pending application, Serial No. 380,267, filed July 22, 1929.

The resin of my present invention is obtained by reacting shellac, manila gum or other natural resins containing hydroxyl or carboxyl groupings or both, with the heat non-convertible resin heretofore described. The hydroxyl-carboxyl ingredient is preferably introduced either by mixing it with the original ingredients or after the acid and polyglycol ingredients have been warmed until the initial action therebetween has apparently ceased.

The amount of the polymerizing ingredient added will depend upon the properties desired in the ultimate product. I have found that 50 parts by weight of shellac added to 50 parts by weight of the acid—polyglycol ingredients—will produce an exceedingly elastic material and I find that the following formula results in a partially heat convertible resin of marked utility:

| | Pounds |
|---|---|
| Polyglycol (diethylene glycol monoethyl ether) | 63 |
| Polybasic acid (phthalic anhydride) | 88 |
| Natural resin (shellac) | 133 |

The foregoing ingredients are heated gently until all reaction has apparently ceased after which the temperature is raised to approximately 165° C., and refluxed at this temperature for around four hours. The water formed in the reaction is distilled off and the heating continued until a resin of the desired viscosity is obtained. Care should be taken that the temperature of the resin does not exceed 185° C. Continuous heating has a tendency to produce a dark brown rubbery compound that is difficulty soluble in acetone. In other words, the addition of shellac apparently produces a partially heat convertible resin, which has been found to serve as an excellent binder in the production of flexible composite mica products.

The resin also can be used as a cement for other substances or as a "plastic shellac" for molding purposes. Copal and manila gum also may be used in place of shellac to produce a heat convertible cement for mica. The amount of these alternative ingredients will depend upon the properties desired in the ultimate product. I have used as much as 30% of manila gum for making a cement for use in the manufacture of flexible mica sheets.

I have found that substances other than shellac, when reacted with an organic polybasic acid (phthalic anhydride or its equivalent) and a polyglycol impart various degrees of heat-convertible properties to the resin, that is to say, one which can be converted into a solid, stable substance by the application of heat, whereas when the acid and polyglycol are reacted together alone, a heat non-convertible resin is the resulting produce. Substances which introduce partially heat convertible characteristics in the resulting complex are various natural resins, such as copal, Congo gum, etc., and I have also found that polyhydric alcohols of which glycerol is an example impart complete heat convertible characteristics.

Since shellac and other natural resins are of exceedingly complicated chemical structure, the specific nature of the various shellacs being not fully understood, the exact nature of the reaction which takes place between the shellac and the glycol and acid ingredients cannot be fully explained except that the carboxyl and hydroxyl group or groups present in the natural resin are inexpensive for the production of the heat curable complex.

The resin of my invention is exceedingly flexible and tough and may be used to increase the toughness, elasticity, and flexibility of other heat convertible resins by mixing my resin therewith. My resin also may be mixed with nitrocellulose and cellulose acetate solution, in order to add toughness and flexibility in lacquers and quick drying paints.

The resin also may be used as a cement for electrical insulating purposes. It may be mixed with shellac to produce a cement or varnish having elastic characteristics and may be used in conjunction with phenol formaldehyde resins in order to produce plasticizing properties and to add to the flexibility and elasticity of the ultimate product.

It is thought that the invention and numerous of its attendant advantages will be understood from the foregoing description and it is obvious that substitutions and changes may be made in the ingredients, their relative proportions and the method of preparing the resin without departing from the spirit or scope of my present invention or sacrificing any of its attendant advantages.

Having thus described my invention what I claim as new and desire to secure by Letters Patent is:

1. The step in the process of preparing a tough, flexible resinous product involving the reaction of a dibasic organic acid and polyglycol in approximately equimolecular proportions, and a natural resin selected from the group consisting of:—shellac, manila gum, Congo gum—which comprises heating the initial reaction product of said components at a temperature below approximately 185° C. until substantially all the water of the reaction is removed and a product of the stated properties is obtained.

2. The step in the process of preparing a tough, flexible resinous product involving the reaction of phthalic anhydride and an alkyl ether derivative of a polyglycol in approximately equimolecular proportions, and shellac, which comprises heating the initial product of said components at a temperature below approximately 185° C. until substantially all the water of the reaction is removed and product of the stated properties is obtained.

3. The step in the process of preparing a tough, flexible resinous product involving the reaction of phthalic anhydride and diethyleneglycol in approximately equimolecular proportions, and shellac, which comprises heating the initial product of said components at a temperature below approximately 185° C. until substantially all the water of the reaction is removed and a product of the stated properties is obtained.

4. The process of preparing a tough, flexible resinous product which comprises reacting a dibasic organic acid and a polyglycol in approximately equimolecular proportions and a natural resin selected from the group consisting of:—shellac, manila gum, Congo gum—heating the initial reaction product of said components at a temperature below approximately 185° C. until substantially all the water of the reaction is removed and a product of the stated properties is obtained.

5. A tough, flexible resinous product of a dibasic organic acid and a polyglycol in approximately equimolecular proportions, and a natural resin selected from the group consisting of:— shellac, manila gum, Congo gum—having the characteristics of the product prepared by the process of claim 1.

6. A tough, flexible resinous product of phthalic anhydride and an alkyl ether derivative of a polyglycol in approximately equimolecular proportions, and shellac, having the characteristics of the product prepared by the process of claim 2.

7. A tough, flexible resinous product of phthalic anhydride and diethyleneglycol in approximately equimolecular proportions, and shellac, having the characteristics of the product prepared by the process of claim 3.

ARTHUR HAROLDSON.